May 25, 1926.
R. R. BEEZLEY
TERMINAL BLOCK ATTACHMENT
Filed May 17, 1924
1,586,438
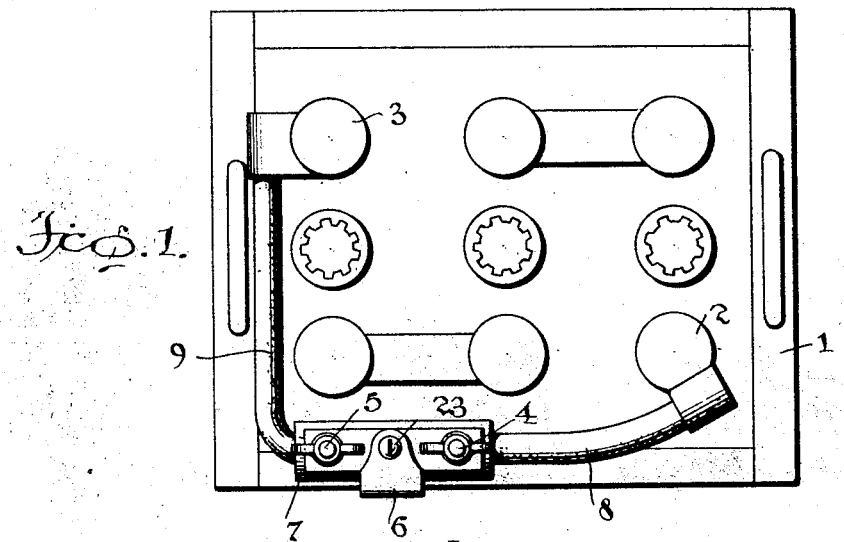
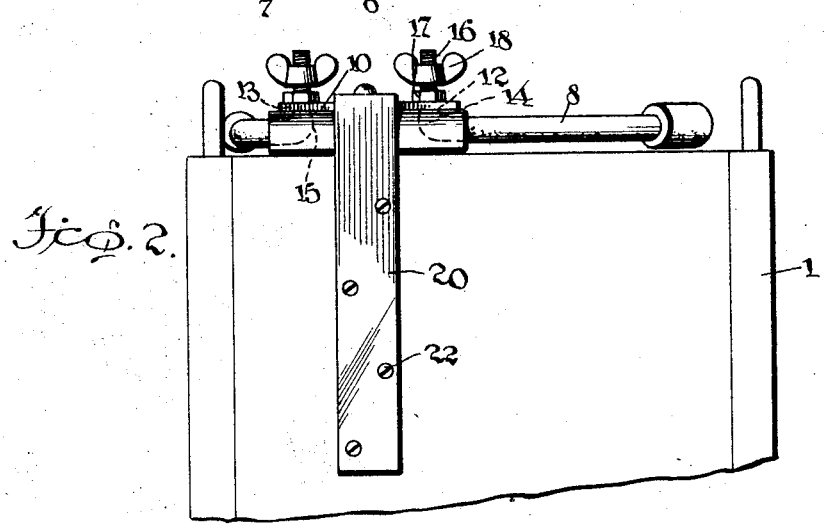
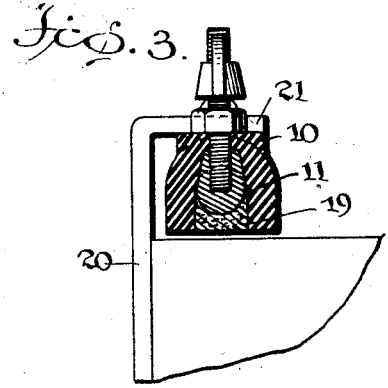
INVENTOR.
R. R. Beezley,
BY
Geo. F. Kimmel.
ATTORNEY.

Patented May 25, 1926.

1,586,438

UNITED STATES PATENT OFFICE.

REGNALD R. BEEZLEY, OF MEMPHIS, TENNESSEE.

TERMINAL-BLOCK ATTACHMENT.

Application filed May 17, 1924. Serial No. 714,015.

This invention relates to a terminal block attachment for storage batteries, and has for its object to provide, in a manner as hereinafter set forth, an attachment of the class referred to for eliminating corrosion at the battery terminals, enabling batteries of the same dimensions to be interchangeable, and to overcome the providing of batteries with different styles of terminals.

With the form or style of terminals now in use, the sealing compound around the positive post of the battery will gradually crack, allowing the acid to creep up the post and eat on the brass, or composition of brass, connection. The locking screw then becomes corroded in the thread and when attempt is made to remove the screw, it requires a greater pull at the terminal in order to do so, regardless of what character of tool is employed. To overcome the objections stated is the primary object of this invention and which is attained by connecting the terminals of the terminal block to the terminals of the battery by lead wires which are burned onto not only the block terminals but also the battery terminals making a sure tight connection at either end of a wire and then applying a sealing composition at the connections between the block terminals and the wires so that such connections will be acid proof and air tight from the bottom thereof, and as battery acid has no bad effect on lead there is no chance of corrosion of the terminals of the terminal block.

Further objects of the invention are to provide, in a manner as hereinafter set forth, a terminal block attachment for storage batteries and which is simple in its construction and arrangement, strong, durable, com40 pact, thoroughly efficient in its use, readily installed and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of a storage battery showing the adaptation therewith of a terminal block attachment in accordance with this invention.

Figure 2 is a fragmentary view, in side elevation, of a storage battery showing the adaptation therewith of a terminal block attachment in accordance with this invention.

Figure 3 is a vertical sectional view of the terminal block attachment.

Figure 4 is a fragmentary view looking towards the bottom of the housing.

Referring to the drawings in detail, 1 denotes the body portion of a storage battery, 2 the positive terminal of the battery, 3 the negative terminal of the battery, 4 the positive terminal of the terminal block, 5 the negative terminal of the terminal block, 6 a coupling element for the terminal block, and 7 a housing of insulation forming an element of the terminal block.

Extending from the terminal 2 to the terminal 4 is a lead conductor 8, and extending from the terminal 3 to the terminal 5 is a lead conductor 9.

The housing 7 which preferably, is substantially semi-oval in cross section, is opened at each end and at its bottom and closed at its top. The housing 7 has the outer face of its top formed with a rectangular portion 10 of a length less than the length of the housing and the latter forms a substantially semi-oval shaped chamber 11 which is closed at its top and open at each end and at its bottom. Extending into the chamber 11 at one end thereof is a conductor 8 and at its other end a conductor 9. The top of the housing 7, at a point between its transverse center and each end is provided with an opening which extends through the rectangular portion 10, and the said openings are indicated at 12, 13 and are arranged at the longitudinal center of the housing.

That end of the conductor 8 which extends into the chamber 11 is upturned in a direction towards the opening 12, as indicated at 14, and that end of the conductor 9 which extends into the chamber 11 is upturned, as at 15 to extend in a direction towards the opening 13. The upturned end 14 of the conductor 8 is spaced from the upturned end 15 of the conductor 9 and the said conductors 8 and 9 are positioned above the bottom of the chamber 11.

The terminal 4, as well as the terminal 5, consists of a bolt or screw of substantial length and diameter and which is peripherally threaded throughout and indicated at 16. The terminal 4, as well as the terminal 5, includes a nut 17 carried by the bolt or screw 16 and which is arranged in abutting relation with respect to the rectangular portion 10 at the top of the housing 7, and each of said terminals is furthermore provided above the nut 17 with a wing nut 18 for securing battery wire connections. The terminal 4 extends down through the opening 12 and the terminal 5 down through the opening 13. The terminal 4 is extended into the upturned portion 14 of the conductor 8 and the terminal 5 is extended in the upturned portion 15 of the conductor 9. The upturned portion 14 is burned on the terminal 4 and the upturned portion 15 is burned on the terminal 5. The upturned portions 14 and 15 snugly engage the side walls and top of the chamber 11, as shown in Figure 3.

After the conductors 8 and 9 have been burned onto the terminals 4 and 5, the chamber 11 is then filled with a battery sealing compound 19 and said compound is flush with the bottom and each end of the housing 7 and such compound makes the chamber 11 acid and air tight from its bottom and protects terminals 4 and 5 so that they will not corrode.

The conductor 8 is burned onto the terminal 2 and the conductor 9 burned onto the terminal 3, and said conductors 8 and 9 are of sufficient size to carry any load that the battery can put out. The burning of the conductors 8, 9, on the terminals 2 and 3, as well as the burning of the conductors 8 and 9 on the terminals 4 and 5, provides a sure tight connection at each end of said conductors.

The coupling element 6 is in the form of a steel strap and consists of a vertically extending arm 20 and a horizontally disposed arm 21 which projects inwardly at right angles with respect to the upper end of the arm 20. The arm 20 is secured to the body portion of the battery by the hold-fast devices 22, and the arm 21 is mounted on the housing 7 between the terminals 4 and 5 and further is secured to said housing 7 by a hold-fast device 23. The coupling element being fixedly secured to the body portion 1 of the battery takes all the strain and vibration of the circuit connections which are attached to the terminals 4 and 5 and which would be delivered to the terminals 2 and 3 if such connections were attached directly to said terminals, and by this arrangement the life of the battery is increased as it is well known that vibration and shaking is very detrimental to the internal parts of storage batteries resulting in the shortening of the life thereof.

It is thought that the many advantages of a storage battery terminal block in accordance with this invention can be readily understood, particularly in view of the fact that the corroding of the terminals is overcome and that it can be readily installed on any and all kinds of storage batteries, and although the preferred embodiment of the invention is as illustrated and described, yet changes in the details of construction can be had which will fall within the light of the invention as claimed.

What I claim is:—

1. A terminal block comprising a housing of insulation having a groove in its bottom side and spaced holes through its top side communicating with said groove, conductors extending into opposite ends of said groove, said conductors having their ends bent to extend into said holes, terminals for said conductors extending through the holes and embedded in the conductors, said terminals carrying means exteriorly of said housing for securing to said terminals circuit connections for the battery, and a sealing compound within said housing and enclosing the portions of said conductors therein.

2. In combination, a housing of insulation open throughout its bottom and further open at each end, a pair of spaced oppositely disposed conductors each extending into said housing at one end thereof and formed with an angularly disposed upstanding inner end, terminals extending through the top of the housing and each having its lower end embedded in one of the angularly disposed ends of a conductor, and a sealing compound enclosing the inner terminal portions of the conductors within the housing.

3. In combination a housing of insulation formed with an open bottom and further open at each end, the top of said housing being flat and provided with a plurality of holes, a conductor extending into said housing at each end thereof, a pair of terminals supported by the housing and extending through the holes in the top thereof and connected to the inner terminal portions of said conductors, a sealing compound within said housing, and means secured to the flat top of the housing for suspending the latter.

In testimony whereof, I affix my signature hereto.

REGNALD R. BEEZLEY.